(12) United States Patent
Ikeda et al.

(10) Patent No.: US 11,237,305 B2
(45) Date of Patent: Feb. 1, 2022

(54) DIFFUSER PLATE

(71) Applicant: KURARAY CO., LTD., Kurashiki (JP)

(72) Inventors: Keisuke Ikeda, Kamisu (JP); Atsushi Uchida, Kamisu (JP); Masaru Karai, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/971,540

(22) PCT Filed: Feb. 15, 2019

(86) PCT No.: PCT/JP2019/005652
§ 371 (c)(1),
(2) Date: Aug. 20, 2020

(87) PCT Pub. No.: WO2019/163678
PCT Pub. Date: Aug. 29, 2019

(65) Prior Publication Data
US 2020/0400863 A1 Dec. 24, 2020

(30) Foreign Application Priority Data
Feb. 22, 2018 (JP) .............................. JP2018-029694

(51) Int. Cl.
*G02B 5/02* (2006.01)
*G02B 3/00* (2006.01)
*G02B 27/48* (2006.01)

(52) U.S. Cl.
CPC ............. *G02B 5/02* (2013.01); *G02B 3/0056* (2013.01); *G02B 27/48* (2013.01)

(58) Field of Classification Search
CPC .. G02B 5/0205; G02B 5/0215; G02B 5/0257; G02B 5/0278; G02B 5/0263; G02B 5/0284; G02B 3/0056; G02B 27/48
See application file for complete search history.

(56) References Cited

U.S. PATENT DOCUMENTS

2011/0001856 A1  1/2011  Matsuoka
2018/0031830 A1  2/2018  Koike et al.

FOREIGN PATENT DOCUMENTS

EP  3 203 275 A1  8/2017
JP  2004-505306 A  2/2004
(Continued)

OTHER PUBLICATIONS

International Search Report dated May 14, 2019 in PCT/JP2019/005652 filed Feb. 15, 2019, citing documents AA-AB and AQ-AS therein, 2 pages.

(Continued)

*Primary Examiner* — Ryan D Howard
(74) *Attorney, Agent, or Firm* — Oblon, McClelland, Maier & Neustadt, L.L.P.

(57) ABSTRACT

Provided is a diffuser plate that makes it possible to mitigate unevenness of luminance or unevenness of color while suppressing speckle noise of transmitted light or reflected light. The diffuser plate of the present invention includes a microlens array having a structure that creates an optical path length difference for incident light or reflected light, the microlenses having the same effective diameter. The microlens array constitutes a basic block structure in which periodic arrangement is provided with a period of an integer multiple of the effective diameter, a two-dimensional second periodic structure having a period that is N times the period of the microlens array in the basic periodic structure is configured by a repetitive arrangement of the basic blocks, and the microlenses are set to create an optical path length difference based upon a specific arrangement within the basic block structure.

3 Claims, 9 Drawing Sheets

(56) References Cited

FOREIGN PATENT DOCUMENTS

| | | |
|---|---|---|
| JP | 2010-145745 A | 7/2010 |
| JP | 2011-30213 A | 2/2011 |
| JP | 2017-122773 A | 7/2017 |
| WO | WO 2016/139769 A1 | 9/2016 |

OTHER PUBLICATIONS

Supplementary European Search Report dated Nov. 3, 2021, in European Patent Application No. 19757846.1 filed Feb. 15, 2019.

A CASE WHERE
NO N×N ARRAY IS APPLIED

A CASE WHERE
THE BASIC 3×3 ARRAY IS APPLIED

A CASE WHERE
NO N×N ARRAY IS APPLIED

A CASE WHERE
THE BASIC 3×3 ARRAY IS APPLIED

A CASE WHERE
THE BASIC 2×2 ARRAY IS APPLIED

A CASE WHERE
THE BASIC 4×4 ARRAY IS APPLIED

A CASE WHERE THE BASIC 5×5 ARRAY IS APPLIED

A CASE WHERE THE BASIC 7×7 ARRAY IS APPLIED

A CASE WHERE
THE MODIFIED 5×5 ARRAY IS APPLIED

A CASE WHERE
THE MODIFIED 7×7 ARRAY IS APPLIED

A CASE WHERE
THE BASIC 9×9 ARRAY IS APPLIED

A CASE WHERE
THE BASIC 11×11 ARRAY IS APPLIED

A CASE WHERE
A 2x2 STAGGERED ARRAY IS APPLIED

A CASE WHERE
A 4x4 STAGGERED ARRAY IS APPLIED

A CASE WHERE
A 2x2 ARRAY IS APPLIED

A CASE WHERE
A 4x4 ARRAY IS APPLIED

DIFFUSER PLATE

TECHNICAL FIELD

The present invention relates to a diffuser plate that uses a microlens array.

BACKGROUND ART

Techniques have been proposed which apply, as a screen, a diffuser plate that uses a microlens array to a head-up display, a laser projector, etc. Advantages that can be obtained by use of a microlens array may include suppression of speckle noise as compared to the case where a diffuser plate such as an opaque plate or opaque glass is used.

For example, in Patent Literature 1, an image forming apparatus is proposed which has a laser projector that uses laser light as a light source and is adapted to project an image formed by an array of a plurality of pixels and a diffuser plate that uses a microlens array in which a plurality of microlenses are arranged. If a microlens array is used, incident light can be appropriately diffused, and a necessary diffusion angle can be freely designed.

In Patent Literature 2, a method is proposed according to which unevenness of luminance or unevenness of color due to the diffracted light caused by periodicity of the microstructure is mitigated through random distribution of at least one of the parameters defining the shape or position of the microstructure of a microlens and the like in accordance with a predetermined probability density function.

In Patent Literatures 3 and 4, methods are proposed which make it possible to create new diffracted light in the gap between traditional diffracted light beams by imparting, to the microlens array, a second periodic structure that has the functionality of creating an optical path length difference for the light transmitted through the individual microlenses, and thereby mitigate the unevenness of luminance or unevenness of color.

CITATION LIST

Patent Literature

Patent Literature 1: Japanese Unexamined Patent Application Publication No. 2010-145745

Patent Literature 2: Published Japanese Translation of PCT International Publication for Patent Application No. 2004-505306

Patent Literature 3: International Patent Publication No. 2016/139769

Patent Literature 4: Japanese Unexamined Patent Application Publication No. 2017-122773

SUMMARY OF INVENTION

Technical Problem

The inventors of the present application have found the following problems.

It is disclosed in Patent Literature 2 that, if a typical microlens array is used, unevenness of luminance occurs due to the diffraction spot caused by its periodicity, but unevenness of luminance can be mitigated by random distribution of at least one of the parameters defining the shape or position of the lens in accordance with a predetermined probability density function. However, if randomness is imparted to the shape and/or position of the lens, a problem arises that speckle noise is likely to occur and the image quality is deteriorated because a random phase difference occurs in the light transmitted through the lens array. Also, while the random distribution mitigates the unevenness of luminance as an overall average of the microlens array, another problem arises that a portion left unaddressed may exist locally.

In Patent Literatures 3 and 4, it is disclosed that a second periodic structure that has the functionality of creating an optical path length difference for the light transmitted through the individual microlenses is imparted to the microlens array so as to mitigate the unevenness of luminance. However, according to the periodic structures defined by staggered arrangement or two vertical axes as proposed in Patent Literatures 3 and 4, the density of diffracted light increases only several times, or differences in luminance occur among the individual diffracted light beams, so that there may be a case where unevenness of luminance cannot be sufficiently mitigated.

In view of the problems of these conventional techniques, it is an object of the present invention to provide a diffuser plate that can further mitigate unevenness of luminance or unevenness of color while suppressing speckle noise of transmitted light or reflected light.

Solution to Problem

A diffuser plate in accordance with the present invention is a transmissive or reflective diffuser plate having a microlens array constituted by a plurality of microlenses, the microlens array being formed on at least either of a light incident surface or a light exit surface, the diffuser plate being characterized by the fact that:

the microlenses have the same effective diameter and substantially the same curvature and have a structure that creates an optical path length difference for transmitted light or reflected light;

each of the microlenses is arranged at intervals based on the effective diameter so as to constitute a two-dimensional basic periodic structure;

the microlenses constitute a basic block constructed by an array of N×N lenses (where N is an integer greater than or equal to 2) having the structure that creates the optical path length difference;

the basic blocks constitute, by repetitive arrangement thereof, a two-dimensional second periodic structure having a period that is N times as long as a period of the microlenses in the basic periodic structure;

the basic block is either an N×N array C in which elements in p rows and q columns (where p and q are integers that satisfy $1 \le$ (p and q) $\le N$) are defined according to the following expression (1):

$$C(p,q)=(p-1)(q-1) \bmod N \text{ or} \quad (1),$$

an N×N array D obtained by an arbitrary row permutation or column permutation performed on the array C; and the optical path length difference created by the lens positioned in the p-th row and the q-th column with respect to the lens in the first row and the first column in accordance with the array C or D is set to C(p, q)/N times or D(p, q)/N times as long as a wavelength λ of incident light.

Also, it is preferable that the basic block is the array C.

Also, it is preferable that the microlenses constitute a basic block obtained by an array of N×N ($2 \le N \le 11$) lenses having a structure that creates the optical path length difference.

Advantageous Effects of Invention

According to the present invention, a diffuser plate is provided which makes it possible to mitigate unevenness of luminance or unevenness of color while suppressing speckle noise of transmitted light or reflected light.

DESCRIPTION OF EMBODIMENTS

Method for Designing Microlens Array

A shape of a lens that serves as a reference is designed based on optical physical properties (in particular, refractive index) of a material to be used to make a diffuser plate and a desired diffusion angle distribution. The shape of the lens may be spherical or aspherical. Optical design is performed using conventional techniques such as ray tracing algorithm. Also, this may be deviated from if it is desirable for the diffusion characteristics to have anisotropy, and the aspect ratio of the lens can be specified in any appropriate manner.

Principle of Optical Path Length Difference Set for the Microlens

If the structure that creates an optical path length difference is not present in each lens as parallel light (with the wavelength $\lambda$) is incident on a microlens array in which square lenses are arranged with a period of L, then the luminance distribution of the emitted light is discretized (which is called diffracted light) with a sine interval of $\lambda/L$ in the vertical and horizontal directions by the well-known diffraction grating action.

If the incident light is not parallel light and has a conical shape with an apparent diameter $\omega$, then each of the directions in which the discretization takes place will define a conical shape with an apparent diameter $\omega$. If $\omega$ is larger than the $2\lambda/L$ value, the state of discretization will be substantially eliminated. However, if $\omega$ is smaller than $2\lambda/L$, then the periodicity of the sine interval $\lambda/L$ remains in the luminance distribution as the remnant of the discretization, and this results in unevenness of luminance between light and dark.

Figure 1A:
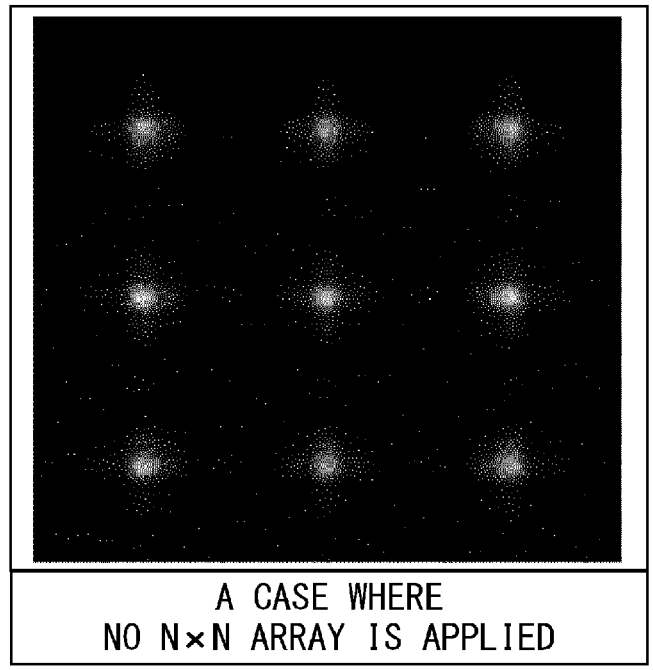
FIG. 1A is a diagram that illustrates a result of simulation of diffracted light of a microlens array having a 40 μm×40 μm period.
Figure 2A:
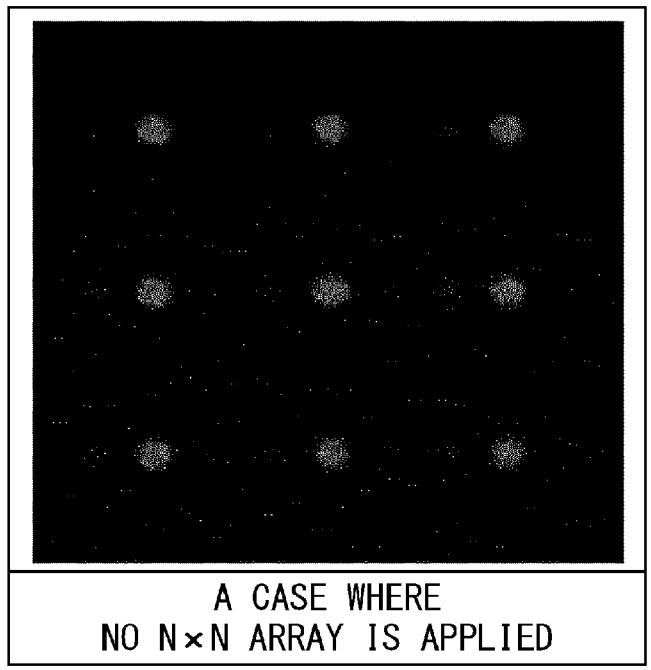
FIG. 2A is a diagram that illustrates a result of diffracted light experiment of a microlens array having a 60 μm×60 μm period.

FIG. 1A illustrates the result of simulation of the diffracted light transmitted through a microlens array having a 40 μm×40 μm period. As discussed above, if each lens does not have the structure that creates an optical path length difference, diffracted light beams discretized in the vertical and horizontal directions are created with a sine interval of $\lambda/L$. Also, FIG. 2A illustrates an image obtained by actually projecting the emitted light of the laser light incident on a microlens array having a 60 μm×60 μm period onto a vertical plane. The laser light emitted in this manner is discretized and agrees well with the result of the simulation.

Reduction in the interval of the diffracted light is of necessity in order that this unevenness of luminance may be overcome. As a solution to this, a possible approach is to impart the structure that creates an optical path length difference to light beams incident on the individual lenses. In view of this, here, let us consider a case where N×N lenses (where N is an integer greater than or equal to 2) are regarded as a basic block and the optical path length difference is created on an N×N array. The actual creation of the optical path length difference in the microlens can be realized by disposing the individual microlens at different positions in the axial direction that is parallel to the optical path, for example, by using the methodology which will be described in detail below.

In the case of the N×N array, the sine interval of the diffracted light can be reduced to a minimum of $\lambda/NL$, and the density of the diffracted light can be increased up to N times in each of the vertical and horizontal directions, and increased by a factor of $N^2$ as a whole in the two directions. At this point, the complex conjugate autocorrelation $cc_N(x/\lambda, y/\lambda)$ of the N×N array should be the one that satisfies the following properties for arbitrary integers m and n.

If m is an integer multiple of N and n is an integer multiple of N, then:

$$cc_N(mL/\lambda, nL/\lambda) = N^2 \qquad (2)$$

If at least either of m and n is a non-integer multiple of N, then:

$$cc_N(mL/\lambda, nL/\lambda) = 0 \quad (3)$$

The expression (2) is the inevitable consequence of the fact that the patterns is a pattern of the vertical and horizontal period NL. The expression (3) is the highest property that can be achieved with an N×N array. Solutions satisfying the expression (3) only for N=2 have hitherto been known (Patent Literature 4).

The present invention provides a microlens array that uses a solution that satisfies the expression (3) even for N≥3 or more. In order to make the unevenness of luminance due to the diffracted light of the microlens array less conspicuous, it is necessary to make the apparent diameter ω of the incident light larger than 2λ/(2 L) when N=2. If N=3, the apparent diameter ω of the incident light needs to be larger than 2λ/(3 L). Accordingly, if N=3, then the apparent diameter ω of the incident light can be reduced to ⅔ times as large as that in the case of N=2. Alternatively, the L value as such can be reduced to improve the resolution limit of the microlens array by a factor of 1.5. Consequently, by using the present invention, it is made possible to construct a system that is more efficient than the conventional techniques.

The expression (3) is not easy to solve. Hence, the inventors set the following sufficient condition instead of the expression (3).

"An arbitrary column vector of an N×N array is orthogonal to the remaining (N−1) arbitrary column vectors and their cyclic permutation vectors."

An N×N array that satisfies this prerequisite is a basic N×N orthogonal array defined in accordance with the expression (4). Here, $g_{pq}$ is the entry in the p-th row and the q-th column of the matrix.

$$g_{pq} = \exp[j2\pi(p-1)(q-1)/N] \quad (4)$$

If $g(x/\lambda, y/\lambda)$ is the complex transmittance with x, y given as the plane position coordinates, then the directional characteristics of the emitted light match the square of the absolute value of Fourier transform $G(\sin \theta x, \sin \theta y)$ thereof. Also, the square of the absolute value of $G(\sin \theta x, \sin \theta y)$ matches the Fourier transform of the complex conjugate autocorrelation $cc(x/\lambda, y/\lambda)$ of $g(x/\lambda, y/\lambda)$.

First, let us consider a 3×3 microlens array in which each lens does not have the structure that creates an optical path length difference. At this point, $g(x/\lambda, y/\lambda)$ will be given as follows. Here, for simplification of the expression, a matrix representation is employed in which the upper left entry is the origin (0, 0).

$$g = \begin{pmatrix} 1 & 1 & 1 \\ 1 & 1 & 1 \\ 1 & 1 & 1 \end{pmatrix} \quad \text{[Math 1]}$$

The square of the absolute value of this Fourier transform $G(\sin \theta x, \sin \theta y)$ will be given as follows:

$$|G|^2 = \begin{pmatrix} 81 & 0 & 0 \\ 0 & 0 & 0 \\ 0 & 0 & 0 \end{pmatrix} \quad \text{[Math 2]}$$

The complex conjugate autocorrelation $cc(pL/\lambda, qL/\lambda)$ will be obtained by performing inverse Fourier transform on this $|G|^2$.

$$cc = \begin{pmatrix} 9 & 9 & 9 \\ 9 & 9 & 9 \\ 9 & 9 & 9 \end{pmatrix} \quad \text{[Math 3]}$$

Accordingly, if each lens does not have the structure that creates an optical path length difference, the expression (3) is not satisfied.

Next, let us consider a 3×3 microlens array in which each lens has the structure that creates an optical path length difference. if N=3, then an array C based on the expression (1) will be given as follows:

$$C = \begin{pmatrix} 0 & 0 & 0 \\ 0 & 1 & 2 \\ 0 & 2 & 1 \end{pmatrix} \quad \text{[Math 4]}$$

The phase difference ΔP derived therefrom will be given as follows:

[Math 5]

$$\Delta P = \begin{pmatrix} 0 & 0 & 0 \\ 0 & \frac{1}{3}\lambda & \frac{2}{3}\lambda \\ 0 & \frac{2}{3}\lambda & \frac{1}{3}\lambda \end{pmatrix} \quad (5)$$

Also, $g(pL/\lambda, qL/\lambda)$ based on the expression (4) will be given as follows:

$$g = \begin{pmatrix} 1 & 1 & 1 \\ 1 & \exp\left(\frac{2i\pi}{3}\right) & \exp\left(\frac{4i\pi}{3}\right) \\ 1 & \exp\left(\frac{4i\pi}{3}\right) & \exp\left(\frac{2i\pi}{3}\right) \end{pmatrix} \quad \text{[Math 6]}$$

The square of the absolute value of this Fourier transform $G(\sin \theta x, \sin \theta y)$ will be given as follows:

$$|G|^2 = \begin{pmatrix} 9 & 9 & 9 \\ 9 & 9 & 9 \\ 9 & 9 & 9 \end{pmatrix} \quad \text{[Math 7]}$$

This indicates that the exit angle of the diffracted light is evenly divided into 9 parts, that is, the diffracted light density will be increased by a factor of 9. The complex conjugate autocorrelation $cc(pL/\lambda, qL/\lambda)$ will be obtained by performing inverse Fourier transform on this $|G|^2$.

$$CC = \begin{pmatrix} 9 & 0 & 0 \\ 0 & 0 & 0 \\ 0 & 0 & 0 \end{pmatrix} \quad \text{[Math 8]}$$

Consequently, the expression (3) is satisfied and the sufficient condition holds. The same can be confirmed for N≥4.

Figure 1B:
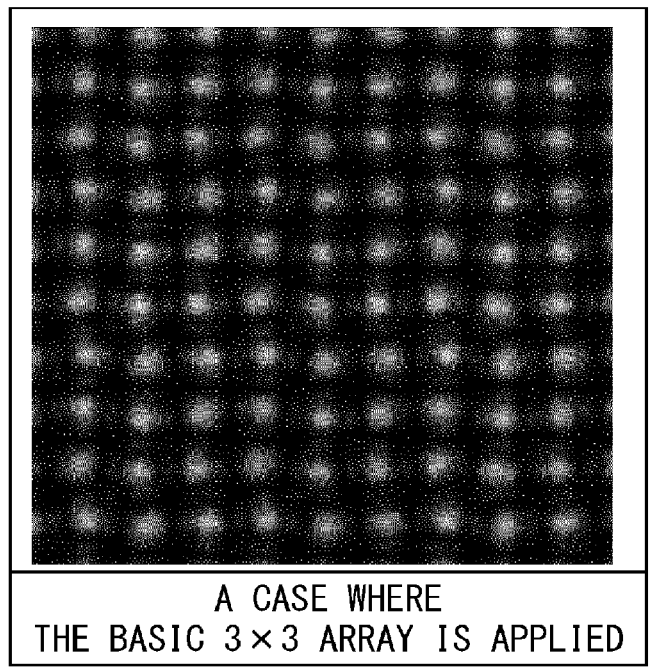
FIG. 1B is a diagram that illustrates a result of simulation of diffracted light of a microlens array having a 40 μm×40 μm period.

FIG. 1B illustrates the result of simulation of the diffracted light that has been transmitted through the microlens array having the structure that creates an optical path length difference by the above-described array with N=3 in the 40 μm×40 μm period.

As can be appreciated from the result of the above calculation, as compared with FIG. 1A, the density of diffracted light is 9 times as large as that of FIG. 1A, so that it can be confirmed that unevenness of luminance is reduced.

Figure 2B:
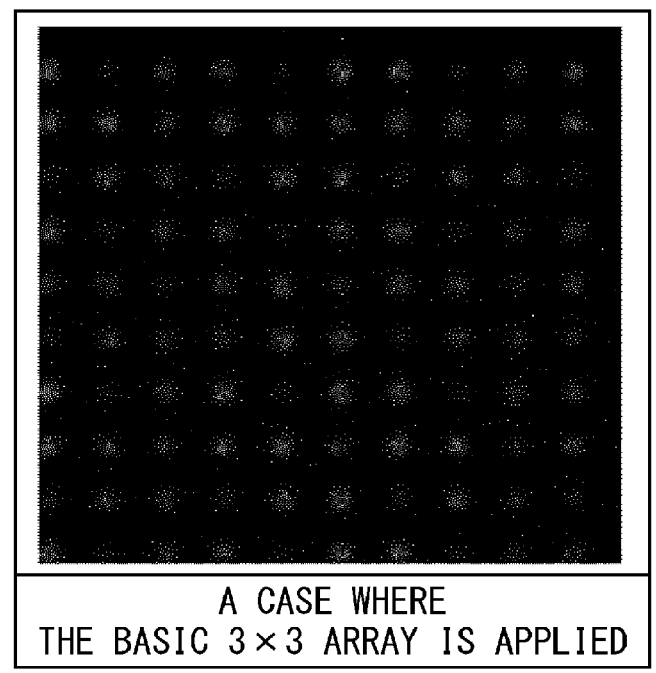
FIG. 2B is a diagram that illustrates a result of diffracted light experiment of a microlens array having a 60 μm×60 μm period.

Also, FIG. 2B illustrates an image, which is projected on a vertical plane, of the emitted light of the laser light beam actually incident on the microlens array having the structure that creates an optical path length difference by the above-described array with N=3 in the 60 μm×60 μm period. A difference in height ΔH is imparted to the lens height for this microlens array in order to create the optical path length difference corresponding to the above-described expression (5). If the material of the microlens array has a refractive index of 1.5 and the light source in use has a wavelength of 630 nm, then the difference ΔH will be given as follows:

$$\Delta H = \begin{pmatrix} 0 & 0 & 0 \\ 0 & 0.42 \ \mu m & 0.84 \ \mu m \\ 0 & 0.84 \ \mu m & 0.42 \ \mu m \end{pmatrix} \quad [\text{Math 9}]$$

The density of the laser light beams emitted as illustrated in FIG. 2B exhibits increase by a factor of 9, which agrees well with the result of the simulation.

Also, the property of the expression (3) is maintained even when permutation of arbitrary columns or permutation of arbitrary rows is performed on the array defined in accordance with the expression (4). As a result, a modified N×N orthogonal array in which columns and rows are permutated will also be useful to address the periodic unevenness of luminance.

When coherent light beams are incident on the microlens array at the same time, the density of the diffracted light becomes larger as the N corresponding to the number of lenses in the basic block becomes larger, so that the effect of reducing the unevenness of luminance is significant. However, if the lens area on which coherent light beams are incident is restricted, then it will be more preferable that the size of the basic block correspond to that lens area.

For example, if laser light beams that do not contribute to scanning should be diffused, the size of the basic block should be specified so that it is substantially equivalent to the size of the laser beam diameter. Meanwhile, if the light beams of the projector that displays an image while performing laser scanning should be diffused, the size of the basic block should be set to a large one in accordance therewith, and the size of the basic block should be specified such that it is substantially equivalent to several times or ten and several times the laser spot diameter. In particular, when the entire microlens array is being scanned with the laser light beams, the entire area may also be defined as the basic block, in which case a larger N is more preferable as discussed above. However, since the minimum value of the phase difference, which is determined as will be described later, becomes smaller as N is made larger, there will be less significance in making N extremely large.

Next, the method for specifying the phase difference will be described. In the context of the present invention, the phase difference is represented using the difference in the optical path lengths of the light beams transmitted through or reflected by the microlens, where the difference is normalized using the wavelength. In order to cause change in the phase difference, various factors can be selected such as lens height, curvature, pitch, arrangement, refractive index, and the like. The context of the present invention is characterized by the fact that, in order to impart the phase difference to the individual lenses, only the height of raising of the lens is changed whilst the curvatures of the individual lenses are almost the same.

Figure 3:
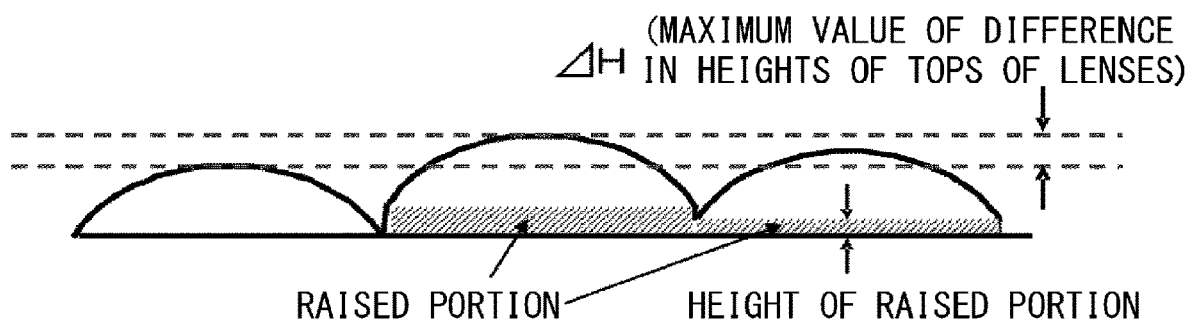
FIG. 3 is a diagram that illustrates a method for controlling the height of a microlens array.

The microlens array used in the transmissive diffuser plate will now be specifically described. As illustrated in FIG. 3, the individual lenses are made to have the same cross section profile, and the height of the raised portion of the lens indicated by the shaded portion is controlled to thereby change the convex portion maximum height of the microlens. In other words, the convex portion maximum height of the microlens is determined by the sum of the lens height determined by the optical design and the height of the raised portion. According to the present invention, the lens height is a fixed value and the height of the raised portion is changed among the individual lenses, and thereby the phase difference is created in the respective microlenses so as to ensure mitigation of the unevenness of luminance and unevenness of color which occur due to diffraction-related factors.

If the difference in height of the convex portion maximum heights of the individual microlenses is ΔH, then the phase difference corresponding to ΔH can be expressed by:

$$\{1000 \times \Delta H \times (n-1)\}/\lambda$$

where n is the refractive index of the material of which the microlens array is composed, and λ(nm) is the wavelength of the light source in use. Here, if the light source involves multiple wavelengths, calculation should be performed for the longest wavelength among the wavelengths in use or the wavelength allowing the highest visibility as the representative one of the multiple wavelengths.

Whilst the foregoing explanations have been given with a convex lens used as an example, the same explanations also apply to the case of a concave lens when read with ΔH replaced with a difference in height ΔD of the concave portion maximum depth of the individual microlenses.

If a convex lens is used in a microlens array used as the reflective diffuser plate, then the incident light is reflected on the surface of the microlens having the distribution in the convex portion maximum height, and the optical path difference that passes through the air occurs, and the phase difference between the individual microlenses occurs. The phase difference corresponding to the maximum height difference ΔH of the convex portion maximum heights between the individual microlenses at this point will be expressed by:

$$\{1000 \times 2\Delta H\}/\lambda$$

Here, if the light source involves multiple wavelengths, then, in the same manner as in the case of the transmissive type, the calculation should be performed for the longest wavelength among the wavelengths in use or the wavelength allowing the highest visibility as the representative one of these wavelengths.

If a concave lens is to be used in a reflective type, the same discussions as in the case of the transmissive type likewise apply when read with ΔH replaced with the maximum height difference ΔD of the concave portion maximum depth of the individual microlenses.

As the method for processing the microlens array based on the design data, various processing methods can be used such as mechanical processing, photolithography using a mask, maskless lithography, etching, and laser ablation. A mold is manufactured using these techniques, and a resin is molded to manufacture a diffuser plate member having a microlens array. The same mold may be used as a diffuser plate of a direct reflection type. The molding method should be selected as appropriate from various molding techniques such as roll-to-roll molding, hot press molding, molding using ultraviolet curable resin, injection molding, and the like. If the diffuser plate member is to be used as a diffusion component of a reflective type, then it should be used with a reflective film such as aluminum vapor deposition film formed on its front or back surface.

The method for producing a mold by laser scanning maskless lithography and electroforming and molding the diffuser plate by hot press molding using the mold will be described in more detail below.

Maskless lithography includes a resist coating step of coating a photoresist on a substrate, an exposure step of exposing a fine pattern to the photoresist, and a development step of developing the photoresist that has been subjected to the exposure to obtain an original component having the fine pattern.

In the resist coating step, a positive photoresist is coated on the substrate. The thickness of the coating film of the photoresist should be equal to or greater than the height of the fine pattern. It is preferable that the coating film is subjected to a baking process at 70 to 110° C. In the exposure step, the photoresist coated in the coating step is irradiated with a laser beam while it is being scanned by the laser beam so as to expose the photoresist.

The wavelength of the laser beam may be selected according to the type of the photoresist and, for example, 351 nm, 364 nm, 458 nm, 488 nm (oscillation wavelength of $Ar^+$ laser), 351 nm, 406 nm, 413 nm (oscillation wavelength of $Kr^+$ laser), 352 nm, 442 nm (oscillation wavelength of He—Cd laser), 355 nm, 473 nm (pulse oscillation wavelength of diode-pumped solid-state laser), 375 nm, 405 nm, 445 nm, 488 nm (semiconductor laser), and the like can be selected.

In the exposure step of a microlens having a raised portion, the resist is scanned by the laser while the laser power is modulated to a value determined by the shape of the lens and the resist sensitivity. The laser used in the laser exposure is focused by an objective lens to focus on the resist.

In order to increase the difference in the height of raising between a certain microlens and another lens adjacent thereto, the difference in laser power between the microlenses adjacent to each other should be increased. However, since the laser spot generally exhibits a Gaussian distribution with a finite diameter, excessive increase in the difference in the laser power causes increase in the areas where the lens shape near the boundary between the adjacent lenses deviates from the shape specified based on the optical design, reducing the proportion of the lens sections where the diffusion angle distribution is the same as those of the other lenses.

Accordingly, in order to obtain the same diffusion angle distribution as that of the optical design, it is preferable to keep the height difference of the raised portion between the adjacent microlenses within a certain range. According to the present invention, since the heights of the lens portions of the individual microlenses are constant, the maximum height difference $\Delta H$ of the convex portion maximum height of the individual microlenses agrees with the maximum height difference of the height of raising. Accordingly, it is preferable to set the raised height so that the phase difference standardized by the aforementioned wavelength falls within the range of 0 to 1.

In the development step, the photoresist that has been subjected to the exposure is developed. The development of the photoresist can be carried out by a known method. The developer is not particularly limited, and an alkali developer such as tetramethylammonium hydroxide (TMAH) can be used.

In the development step, the photoresist is removed according to the exposure amount, and the fine pattern shape of the photoresist is formed. If a positive resist is used in the exposure step and the exposure is carried out with the laser power according to the shape of the microlens configured by a concave lens, then an original microlens component with the concave lens formed on the photoresist is obtained.

Next, in the electroforming step, the surface of the photoresist having the fine pattern that has been formed by the exposure and the development is subjected to a conductivity treatment by a method such as vapor deposition of nickel metal. Further, nickel is deposited on the surface of the vapor-deposited film in a plate shape with a desired thickness by electroforming and, when this nickel plate is peeled from the photoresist original component, a die (stamper) will be obtained in which the microlens array based on a convex lens is formed with the concave lens shape of the photoresist has been inverted and transferred.

In the molding step, the convex lens-shaped fine pattern is transferred to an acrylic sheet by a hot press method in which the acrylic sheet is pressed while being heated using the aforementioned stamper. As a result, it is made possible to manufacture a microlens array member using a concave lens. If double-sided molding with stampers arranged on both sides is adopted, it is also possible to mold a member with a microlens array formed on both sides. The resin used in the molding is not limited to acrylic, and a resin that can be used for the diffuser plate should be selected according to the molding conditions.

In order to obtain a microlens array member configured by a convex lens, electroforming duplication is carried out using, as the mold, the stamper (convex lens) that has been obtained in the above-described electroforming step, and a stamper with a microlens array formed using a concave lens is produced, and this stamper should be used to perform hot press molding.

Whilst it will be appreciated that a method for exposing the resist by modulating the exposure power according to the convex lens in the exposure step of the maskless lithography can be adopted, the above-described method for performing electroforming duplication of the stamper in the electroforming step will be simpler.

When the diffuser plate is to be used as a diffuser plate of a reflection type, for example, an aluminum reflective film should be vacuum-deposited on the surface of a member on which a microlens array is formed, and incident light should be reflected by the aluminum surface. Also, when the microlens array is a member formed on only one surface of the substrate, a possible configuration is such that the light may be incident from the mirror surface side of the substrate and reflected by the microlens array surface on which the aluminum reflective film is formed.

On the other hand, a configuration in which light is incident from the microlens array surface on which no reflective film is formed and reflected on the mirror surface side on which the reflective film is formed can also be used as a diffuser plate. Further, another possible configuration may be adopted according to which a substrate with microlens array formed on both sides is used, the thickness of the reflective film on the incidence side is adjusted to provide a half mirror, and the back side thereof is made to have a reflectance of almost 100%, and thereby a diffuser plate using two microlens arrays, i.e., microlens arrays provided on the front and back surfaces can be obtained. Also, if necessary, a protective layer may be coated to protect the aluminum reflective film.

EMBODIMENTS

The present invention will be described further in detail on the basis of the embodiments of the present invention.

Embodiment 1 Basic 2×2 Array

The phase difference $\Delta P$ caused by the microlens array having a 40 μm×40 μm period where the basic 2×2 array obtained by substituting N=2 in the expression (4) is applied will be given as follows:

[Math 10]
$$\Delta P = \begin{pmatrix} 0 & 0 \\ 0 & \frac{1}{2}\lambda \end{pmatrix}$$

Figure 4A:
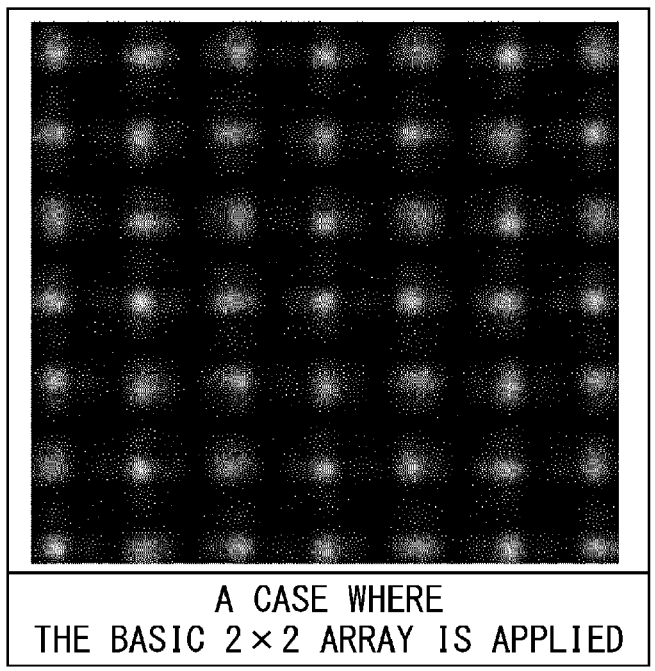
FIG. 4A is a diagram that illustrates a result of simulation of diffracted light of a microlens array having a 40 μm×40 μm period in accordance with Embodiment 1.

The result of simulation of diffracted light at this point is illustrated in FIG. 4A. Compared with FIG. 1A, the density of diffracted light is 4 times as large as that of FIG. 1A, so that it can be confirmed that the unevenness of luminance is reduced.

Embodiment 2 Basic 4×4 Array

The phase difference $\Delta P$ caused by a microlens array having a 40 μm×40 μm period where the basic 4×4 array obtained by substituting N=4 in the expression (4) is applied will be given as follows:

[Math 11]
$$\Delta P = \begin{pmatrix} 0 & 0 & 0 & 0 \\ 0 & \frac{1}{4}\lambda & \frac{2}{4}\lambda & \frac{3}{4}\lambda \\ 0 & \frac{2}{4}\lambda & 0 & \frac{2}{4}\lambda \\ 0 & \frac{3}{4}\lambda & \frac{2}{4}\lambda & \frac{1}{4}\lambda \end{pmatrix}$$

Figure 4B:
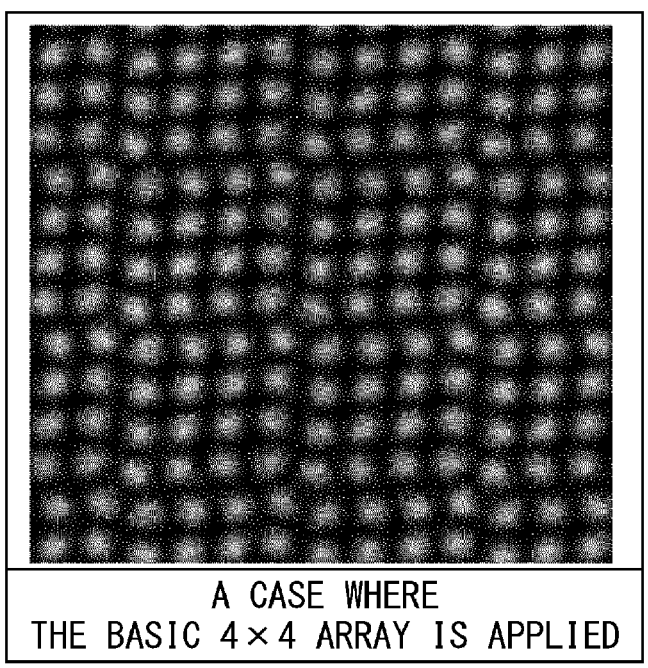
FIG. 4B is a diagram that illustrates a result of simulation of diffracted light of a microlens array having a 40 μm×40 μm period in accordance with Embodiment 2.

The result of simulation of diffracted light at this point is illustrated in FIG. 4B. Compared with FIG. 1A, the density of diffracted light is 16 times as large as that of FIG. 1A, so that it can be confirmed that the unevenness of luminance is reduced.

Embodiment 3 Basic 5×5 Array

The phase difference $\Delta P$ caused by the microlens array having a 40 μm×40 μm period where the basic 5×5 array obtained by substituting N=5 in the expression (4) is applied will be given as follows:

[Math 12]
$$\Delta P = \begin{pmatrix} 0 & 0 & 0 & 0 & 0 \\ 0 & \frac{1}{5}\lambda & \frac{2}{5}\lambda & \frac{3}{5}\lambda & \frac{4}{5}\lambda \\ 0 & \frac{2}{5}\lambda & \frac{4}{5}\lambda & \frac{1}{5}\lambda & \frac{3}{5}\lambda \\ 0 & \frac{3}{5}\lambda & \frac{1}{5}\lambda & \frac{4}{5}\lambda & \frac{2}{5}\lambda \\ 0 & \frac{4}{5}\lambda & \frac{3}{5}\lambda & \frac{2}{5}\lambda & \frac{1}{5}\lambda \end{pmatrix} \quad (12)$$

Figure 4C:
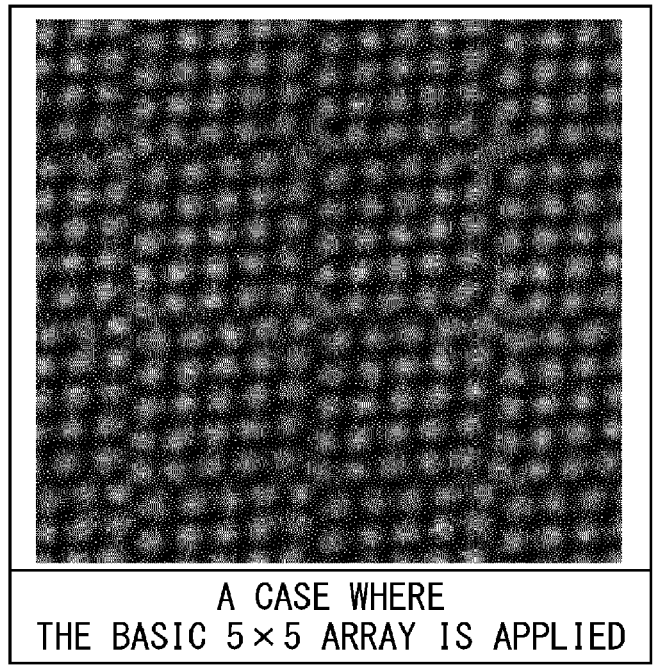
FIG. 4C is a diagram that illustrates a result of simulation of diffracted light of a microlens array having a 40 μm×40 μm period in accordance with Embodiment 3.

The result of simulation of diffracted light at this point is illustrated in FIG. 4C. Compared with FIG. 1A, the density of diffracted light is 25 times as large as that of FIG. 1A, so that it can be confirmed that the unevenness of luminance is reduced.

Embodiment 4 Basic 7×7 Array

The phase difference $\Delta P$ caused by the 40 μm×40 μm pitch microlens array where the basic 7×7 array obtained by substituting N=7 in the expression (4) is applied will be given as follows:

[Math 13]
$$\Delta P = \begin{pmatrix} 0 & 0 & 0 & 0 & 0 & 0 & 0 \\ 0 & \frac{1}{7}\lambda & \frac{2}{7}\lambda & \frac{3}{7}\lambda & \frac{4}{7}\lambda & \frac{5}{7}\lambda & \frac{6}{7}\lambda \\ 0 & \frac{2}{7}\lambda & \frac{4}{7}\lambda & \frac{6}{7}\lambda & \frac{1}{7}\lambda & \frac{3}{7}\lambda & \frac{5}{7}\lambda \\ 0 & \frac{3}{7}\lambda & \frac{6}{7}\lambda & \frac{2}{7}\lambda & \frac{5}{7}\lambda & \frac{1}{7}\lambda & \frac{4}{7}\lambda \\ 0 & \frac{4}{7}\lambda & \frac{1}{7}\lambda & \frac{5}{7}\lambda & \frac{2}{7}\lambda & \frac{6}{7}\lambda & \frac{3}{7}\lambda \\ 0 & \frac{5}{7}\lambda & \frac{3}{7}\lambda & \frac{1}{7}\lambda & \frac{6}{7}\lambda & \frac{4}{7}\lambda & \frac{2}{7}\lambda \\ 0 & \frac{6}{7}\lambda & \frac{5}{7}\lambda & \frac{4}{7}\lambda & \frac{3}{7}\lambda & \frac{2}{7}\lambda & \frac{1}{7}\lambda \end{pmatrix} \quad (13)$$

Figure 4D:
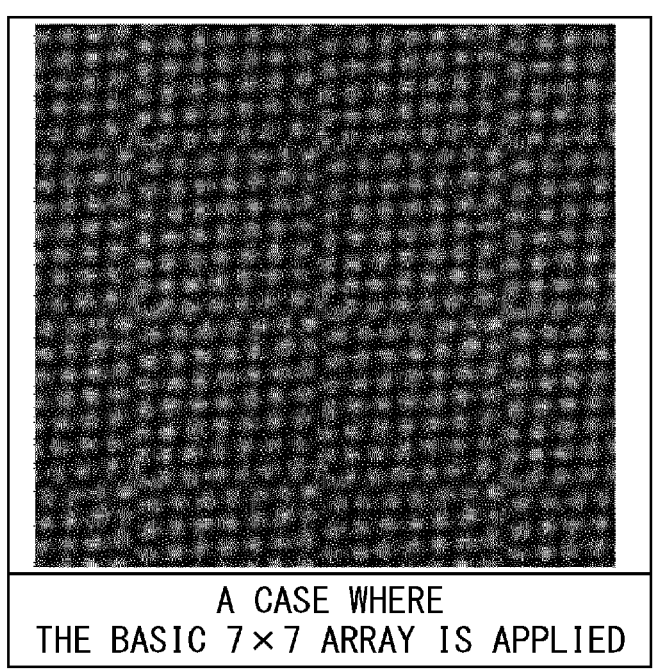
FIG. 4D is a diagram that illustrates a result of simulation of diffracted light of a microlens array having a 40 μm×40 μm period in accordance with Embodiment 4.

The result of simulation of diffracted light at this point is illustrated in FIG. 4D. Compared with FIG. 1A, the density of diffracted light is 49 times as large as that of FIG. 1A, so that it can be confirmed that the unevenness of luminance is reduced.

Embodiment 5 Modified 5×5 Array

Let us now consider a modified 5×5 array obtained by column permutation performed on the basic 5×5 array.

A modified 5×5 array will be obtained by performing column permutation on the second column and the third column and on the fourth column and the fifth column of the 5×5 array illustrated in the above-described expression (12) and then performing column permutation on the second column and the fifth column, and the phase difference $\Delta P$ caused by the thus-obtained modified 5×5 array will be given as follows:

$$\Delta P = \begin{pmatrix} 0 & 0 & 0 & 0 & 0 \\ 0 & \frac{3}{5}\lambda & \frac{1}{5}\lambda & \frac{4}{5}\lambda & \frac{2}{5}\lambda \\ 0 & \frac{1}{5}\lambda & \frac{2}{5}\lambda & \frac{3}{5}\lambda & \frac{4}{5}\lambda \\ 0 & \frac{4}{5}\lambda & \frac{3}{5}\lambda & \frac{2}{5}\lambda & \frac{1}{5}\lambda \\ 0 & \frac{2}{5}\lambda & \frac{4}{5}\lambda & \frac{1}{5}\lambda & \frac{3}{5}\lambda \end{pmatrix}$$ [Math 14]

Figure 4E:
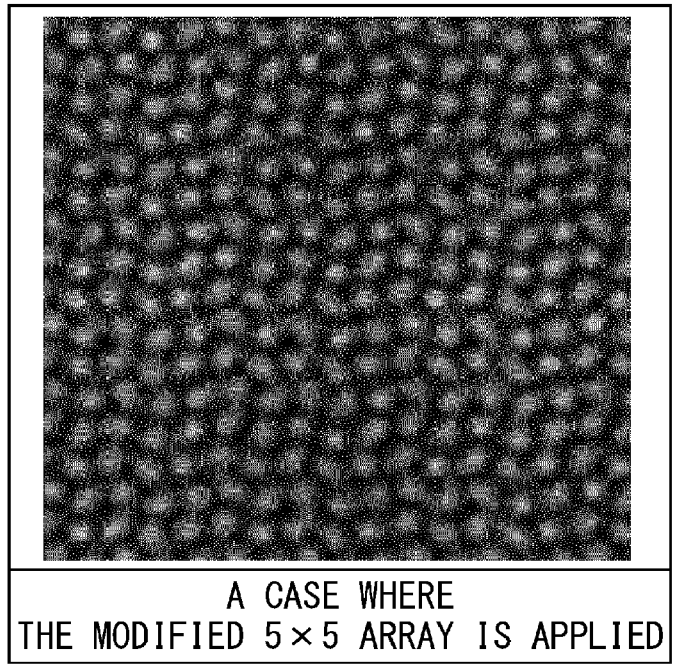
FIG. 4E is a diagram that illustrates a result of simulation of diffracted light of a microlens array having a 40 μm×40 μm period in accordance with Embodiment 5.

The result of simulation of diffracted light of a 40 μm×40 μm pitch microlens array where a modified 5×5 array is applied is illustrated in FIG. 4E. Compared with FIG. 1A, the density of diffracted light is 25 times as large as that of FIG. 1A, so that, in the same manner as the basic 5×5 array, it can be confirmed that the unevenness of luminance is reduced. The modified 5×5 array is not limited to the one obtained by the aforementioned column permutation, and may correspond to arrays obtained by performing any appropriate column permutation or row permutation, and the same or similar effect of reducing the unevenness of luminance can be obtained.

Embodiment 6 Modified 7×7 Array

Let us now consider a modified 7×7 array obtained by column permutation performed on the basic 7×7 array.

A modified 7×7 array will be obtained by performing column permutation on the second column and the fifth column, and on the fourth column and the seventh column of the 7×7 array illustrated in the above-described expression (13) and then performing column permutation on the third column and the fifth column and on the fourth column and the sixth column, and the phase difference ΔP caused by the thus-obtained modified 7×7 array will be given as follows:

$$\Delta P = \begin{pmatrix} 0 & 0 & 0 & 0 & 0 & 0 & 0 \\ 0 & \frac{4}{7}\lambda & \frac{1}{7}\lambda & \frac{5}{7}\lambda & \frac{2}{7}\lambda & \frac{6}{7}\lambda & \frac{3}{7}\lambda \\ 0 & \frac{1}{7}\lambda & \frac{2}{7}\lambda & \frac{3}{7}\lambda & \frac{4}{7}\lambda & \frac{5}{7}\lambda & \frac{6}{7}\lambda \\ 0 & \frac{5}{7}\lambda & \frac{3}{7}\lambda & \frac{1}{7}\lambda & \frac{6}{7}\lambda & \frac{4}{7}\lambda & \frac{2}{7}\lambda \\ 0 & \frac{2}{7}\lambda & \frac{4}{7}\lambda & \frac{6}{7}\lambda & \frac{1}{7}\lambda & \frac{3}{7}\lambda & \frac{5}{7}\lambda \\ 0 & \frac{6}{7}\lambda & \frac{5}{7}\lambda & \frac{4}{7}\lambda & \frac{3}{7}\lambda & \frac{2}{7}\lambda & \frac{1}{7}\lambda \\ 0 & \frac{3}{7}\lambda & \frac{6}{7}\lambda & \frac{2}{7}\lambda & \frac{5}{7}\lambda & \frac{1}{7}\lambda & \frac{4}{7}\lambda \end{pmatrix}$$ [Math 15]

Figure 4F:
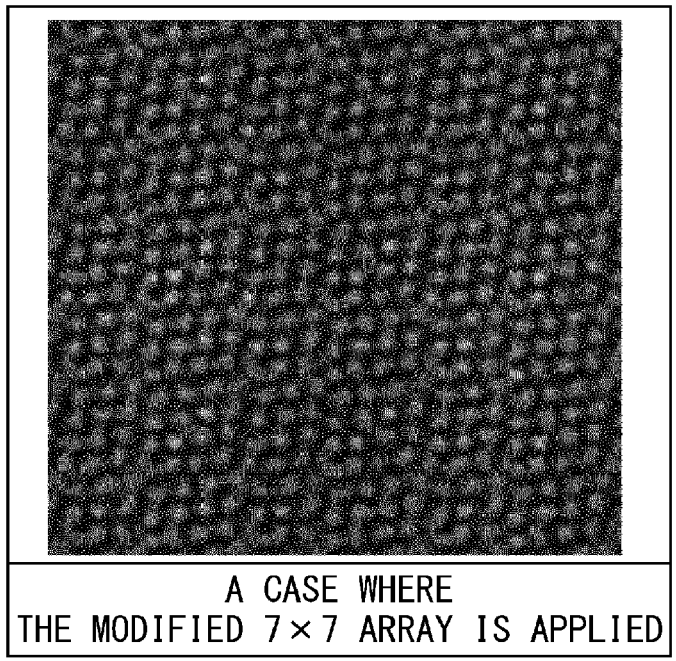
FIG. 4F is a diagram that illustrates a result of simulation of diffracted light of a microlens array having a 40 μm×40 μm period in accordance with Embodiment 6.

The result of simulation of diffracted light of a 40 μm×40 μm pitch micro lens array in which a modified 7×7 array is applied is illustrated in FIG. 4F. Compared with FIG. 1A, the density of diffracted light is 49 times as large as that of FIG. 1A, so that, in the same manner as the basic 7×7 array, it can be confirmed that the unevenness of luminance is reduced. The modified 7×7 array is not limited to the one obtained by the aforementioned column permutation, and may correspond to arrays obtained by performing any appropriate column permutation or row permutation, and the same or similar effect of reducing the unevenness of luminance can be obtained.

Embodiment 7 Basic 9×9 Array

The phase difference ΔP caused by the 40 μm×40 μm pitch microlens array where the basic 9×9 array obtained by substituting N=9 in the expression (4) is applied will be given as follows:

$$\Delta P = \begin{pmatrix} 0 & 0 & 0 & 0 & 0 & 0 & 0 & 0 & 0 \\ 0 & \frac{1}{9}\lambda & \frac{2}{9}\lambda & \frac{3}{9}\lambda & \frac{4}{9}\lambda & \frac{5}{9}\lambda & \frac{6}{9}\lambda & \frac{7}{9}\lambda & \frac{8}{9}\lambda \\ 0 & \frac{2}{9}\lambda & \frac{4}{9}\lambda & \frac{6}{9}\lambda & \frac{8}{9}\lambda & \frac{1}{9}\lambda & \frac{3}{9}\lambda & \frac{5}{9}\lambda & \frac{7}{9}\lambda \\ 0 & \frac{3}{9}\lambda & \frac{6}{9}\lambda & 0 & \frac{3}{9}\lambda & \frac{6}{9}\lambda & 0 & \frac{3}{9}\lambda & \frac{6}{9}\lambda \\ 0 & \frac{4}{9}\lambda & \frac{8}{9}\lambda & \frac{3}{9}\lambda & \frac{7}{9}\lambda & \frac{2}{9}\lambda & \frac{6}{9}\lambda & \frac{1}{9}\lambda & \frac{5}{9}\lambda \\ 0 & \frac{5}{9}\lambda & \frac{1}{9}\lambda & \frac{6}{9}\lambda & \frac{2}{9}\lambda & \frac{7}{9}\lambda & \frac{3}{9}\lambda & \frac{8}{9}\lambda & \frac{4}{9}\lambda \\ 0 & \frac{6}{9}\lambda & \frac{3}{9}\lambda & 0 & \frac{6}{9}\lambda & \frac{3}{9}\lambda & 0 & \frac{6}{9}\lambda & \frac{3}{9}\lambda \\ 0 & \frac{7}{9}\lambda & \frac{5}{9}\lambda & \frac{3}{9}\lambda & \frac{1}{9}\lambda & \frac{8}{9}\lambda & \frac{6}{9}\lambda & \frac{4}{9}\lambda & \frac{2}{9}\lambda \\ 0 & \frac{8}{9}\lambda & \frac{7}{9}\lambda & \frac{6}{9}\lambda & \frac{5}{9}\lambda & \frac{4}{9}\lambda & \frac{3}{9}\lambda & \frac{2}{9}\lambda & \frac{1}{9}\lambda \end{pmatrix}$$ [Math 16]

Figure 4G:
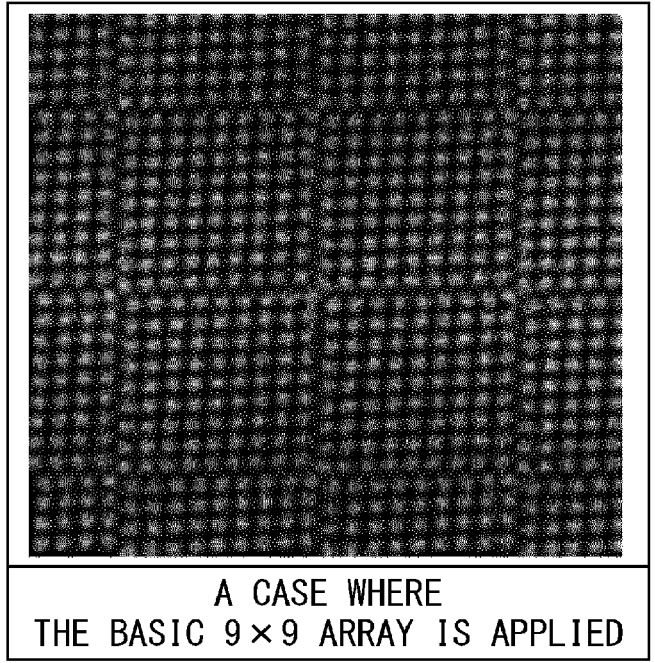
FIG. 4G is a diagram that illustrates a result of simulation of diffracted light of a microlens array having a 40 μm×40 μm period in accordance with Embodiment 7.

The result of simulation of diffracted light at this point is illustrated in FIG. 4G. Compared with FIG. 1A, the density of diffracted light is 81 times as large as that of FIG. 1A, so that it can be confirmed that the unevenness of luminance is reduced.

Embodiment 8 Basic 11×11 Array

The phase difference ΔP caused by the 40 μm×40 μm pitch microlens array where the basic 11×11 array obtained by substituting N=11 in the expression (4) is applied will be given as follows:

$$\Delta P = \begin{pmatrix} 0 & 0 & 0 & 0 & 0 & 0 & 0 & 0 & 0 & 0 & 0 \\ 0 & \frac{1}{11}\lambda & \frac{2}{11}\lambda & \frac{3}{11}\lambda & \frac{4}{11}\lambda & \frac{5}{11}\lambda & \frac{6}{11}\lambda & \frac{7}{11}\lambda & \frac{8}{11}\lambda & \frac{9}{11}\lambda & \frac{10}{11}\lambda \\ 0 & \frac{2}{11}\lambda & \frac{4}{11}\lambda & \frac{6}{11}\lambda & \frac{8}{11}\lambda & \frac{10}{11}\lambda & \frac{1}{11}\lambda & \frac{3}{11}\lambda & \frac{5}{11}\lambda & \frac{7}{11}\lambda & \frac{9}{11}\lambda \\ 0 & \frac{3}{11}\lambda & \frac{6}{11}\lambda & \frac{9}{11}\lambda & \frac{1}{11}\lambda & \frac{4}{11}\lambda & \frac{7}{11}\lambda & \frac{10}{11}\lambda & \frac{2}{11}\lambda & \frac{5}{11}\lambda & \frac{8}{11}\lambda \\ 0 & \frac{4}{11}\lambda & \frac{8}{11}\lambda & \frac{1}{11}\lambda & \frac{5}{11}\lambda & \frac{9}{11}\lambda & \frac{2}{11}\lambda & \frac{6}{11}\lambda & \frac{10}{11}\lambda & \frac{3}{11}\lambda & \frac{7}{11}\lambda \\ 0 & \frac{5}{11}\lambda & \frac{10}{11}\lambda & \frac{4}{11}\lambda & \frac{9}{11}\lambda & \frac{3}{11}\lambda & \frac{8}{11}\lambda & \frac{2}{11}\lambda & \frac{7}{11}\lambda & \frac{1}{11}\lambda & \frac{6}{11}\lambda \\ 0 & \frac{6}{11}\lambda & \frac{1}{11}\lambda & \frac{7}{11}\lambda & \frac{2}{11}\lambda & \frac{8}{11}\lambda & \frac{3}{11}\lambda & \frac{9}{11}\lambda & \frac{4}{11}\lambda & \frac{10}{11}\lambda & \frac{5}{11}\lambda \\ 0 & \frac{7}{11}\lambda & \frac{3}{11}\lambda & \frac{10}{11}\lambda & \frac{6}{11}\lambda & \frac{2}{11}\lambda & \frac{9}{11}\lambda & \frac{5}{11}\lambda & \frac{1}{11}\lambda & \frac{8}{11}\lambda & \frac{4}{11}\lambda \\ 0 & \frac{8}{11}\lambda & \frac{5}{11}\lambda & \frac{2}{11}\lambda & \frac{10}{11}\lambda & \frac{7}{11}\lambda & \frac{4}{11}\lambda & \frac{1}{11}\lambda & \frac{9}{11}\lambda & \frac{6}{11}\lambda & \frac{3}{11}\lambda \\ 0 & \frac{9}{11}\lambda & \frac{7}{11}\lambda & \frac{5}{11}\lambda & \frac{3}{11}\lambda & \frac{1}{11}\lambda & \frac{10}{11}\lambda & \frac{8}{11}\lambda & \frac{6}{11}\lambda & \frac{4}{11}\lambda & \frac{2}{11}\lambda \\ 0 & \frac{10}{11}\lambda & \frac{9}{11}\lambda & \frac{8}{11}\lambda & \frac{7}{11}\lambda & \frac{6}{11}\lambda & \frac{5}{11}\lambda & \frac{4}{11}\lambda & \frac{3}{11}\lambda & \frac{2}{11}\lambda & \frac{1}{11}\lambda \end{pmatrix}$$ [Math 17]

Figure 4H:
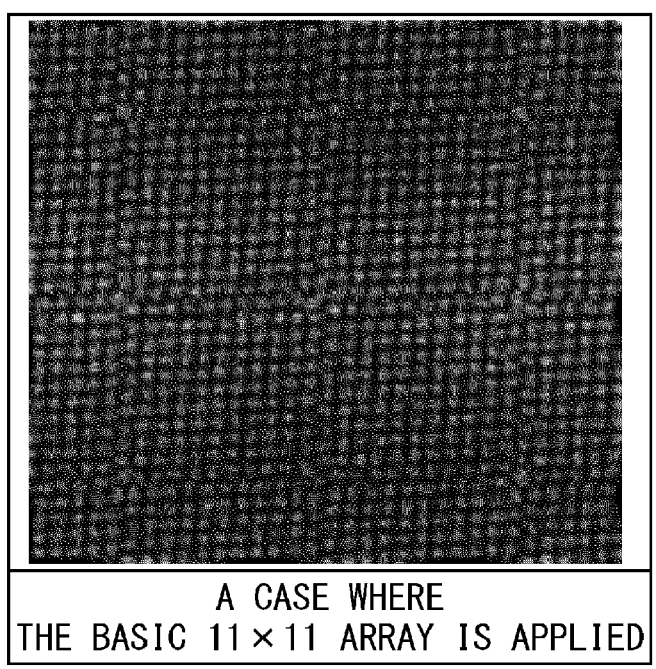
FIG. 4H is a diagram that illustrates a result of simulation of diffracted light of a microlens array having a 40 μm×40 μm period in accordance with Embodiment 8.

The result of simulation of diffracted light at this point is illustrated in FIG. 4H. Compared with FIG. 1A, the density of diffracted light is 121 times as large as that of FIG. 1A, so that it can be confirmed that the unevenness of luminance is reduced.

Comparative Example 1 2×2 Staggered Array

Let us now consider a 2×2 array as illustrated in Patent Literature 3. In this example, a 2×2 array in which the structure that creates an optical path length difference is arranged in a staggered fashion is defined as the basic block, and it is regarded as preferable to set the optical path length difference to 0.283 times the wavelength. Hence, the phase difference ΔP which the 2×2 staggered array generates can be expressed as follows:

$$\Delta P = \begin{pmatrix} 0 & 0.283\lambda \\ 0.283\lambda & 0 \end{pmatrix}$$ [Math 18]

Figure 5A:
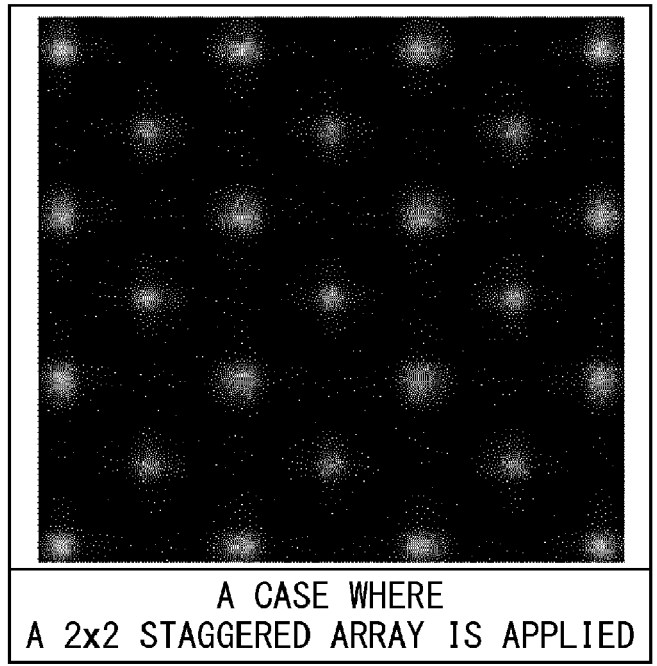
FIG. 5A is a diagram that illustrates a result of simulation of diffracted light of a microlens array having a 40 μm×40 μm period in accordance with Comparative Example 1.

The result of simulation of diffracted light of a microlens array having a 40 μm×40 μm period where this 2×2 staggered array is applied is illustrated in FIG. 5A. The density of the diffracted light is increased as compared with FIG. 1A and the unevenness of luminance is reduced. However, since the density of the diffracted light is small as compared with the basic 3×3 array of FIG. 1B, its effect of reduction in the unevenness of luminance is inferior to that of the present invention.

Comparative Example 2 4×4 Staggered Array

Let us now consider a 4×4 array as illustrated in Patent Literature 3. In this example, a 4×4 array in which the structure that creates an optical path length difference is arranged in a staggered fashion is defined as the basic block, and it is regarded as preferable to set the optical path length difference to 0.377 times the wavelength. Hence, the phase difference ΔP which the 2×2 staggered array generates can be expressed as follows:

$$\Delta P = \begin{pmatrix} 0 & 0 & 0.377\lambda & 0.377\lambda \\ 0 & 0 & 0.377\lambda & 0.377\lambda \\ 0.377\lambda & 0.377\lambda & 0 & 0 \\ 0.377\lambda & 0.377\lambda & 0 & 0 \end{pmatrix}$$ [Math 19]

Figure 5B:
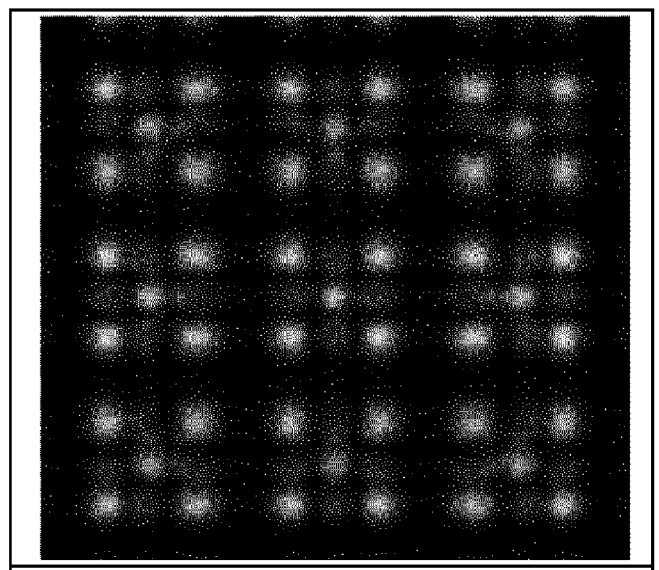
FIG. 5B is a diagram that illustrates a result of simulation of diffracted light of a microlens array having a 40 μm×40 μm period in accordance with Comparative Example 2.

The result of simulation of diffracted light of the 40 μm×40 μm pitch microlens array in which this 4×4 staggered array is applied is illustrated in FIG. 5B. The density of the diffracted light is increased as compared with FIG. 1A and the unevenness of luminance is reduced. However, since the density of the diffracted light is small as compared with the basic 3×3 array of FIG. 1B, its effect of reduction in the unevenness of luminance is inferior to that of the present invention.

Comparative Example 3 2×2 Array (Patent Literature 4)

Let us now consider a 2×2 array as illustrated in Patent Literature 4. In this example, a 2×2 array defined by the sum of the respective optical path length differences caused by the periodic phase structure in the x-direction and the periodic phase structure in the y-direction is defined as the basic block, and it is regarded as preferable to set the optical path length difference to ¼ times the wavelength. Hence, the phase difference ΔP caused by this 2×2 array can be expressed as follows:

$$\Delta P = \begin{pmatrix} 0 & \frac{1}{4}\lambda \\ \frac{1}{4}\lambda & \frac{2}{4}\lambda \end{pmatrix}$$ [Math 20]

Figure 5C:
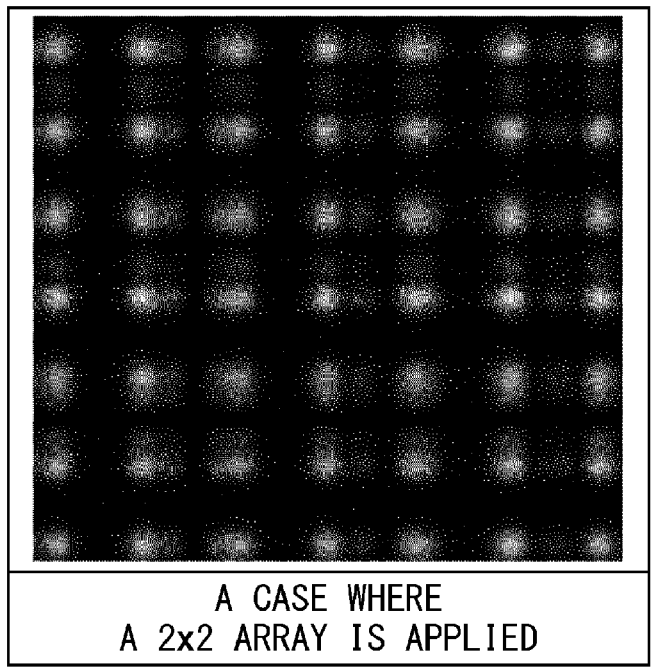
FIG. 5C is a diagram that illustrates a result of simulation of diffracted light of a microlens array having a 40 μm×40 μm period in accordance with Comparative Example 3.

The result of simulation of diffracted light of 40 μm×40 μm pitch microlens array in which this 2×2 array is applied is illustrated in FIG. 5C. The density of the diffracted light is increased as compared with FIG. 1A and the unevenness of luminance is reduced. However, as compared with the 2×2 array of Embodiment 1, in spite of the fact that the level of the phase difference to be provided is raised and a lens having a sophisticated configuration needs to be provided, the effect of reducing the unevenness of luminance is in the level similar to that of the 2×2 basic array of the present invention illustrated in FIG. 4A.

Comparative Example 4 4×4 Array (Patent Literature 4)

Let us now consider a 4×4 array as illustrated in Patent Literature 4. In this example, a 4×4 array defined by the sum of the respective optical path length differences caused by the periodic phase structure in the x-direction and the periodic phase structure in the y-direction is defined as the basic block, and it is regarded as preferable to set the optical path length difference to ½ times the wavelength. Hence, the phase difference ΔP caused by this 4×4 array can be expressed as follows:

$$\Delta P = \begin{pmatrix} 0 & 0 & \frac{1}{2}\lambda & \frac{1}{2}\lambda \\ 0 & 0 & \frac{1}{2}\lambda & \frac{1}{2}\lambda \\ \frac{1}{2}\lambda & \frac{1}{2}\lambda & 0 & 0 \\ \frac{1}{2}\lambda & \frac{1}{2}\lambda & 0 & 0 \end{pmatrix}$$ [Math 21]

Figure 5D:
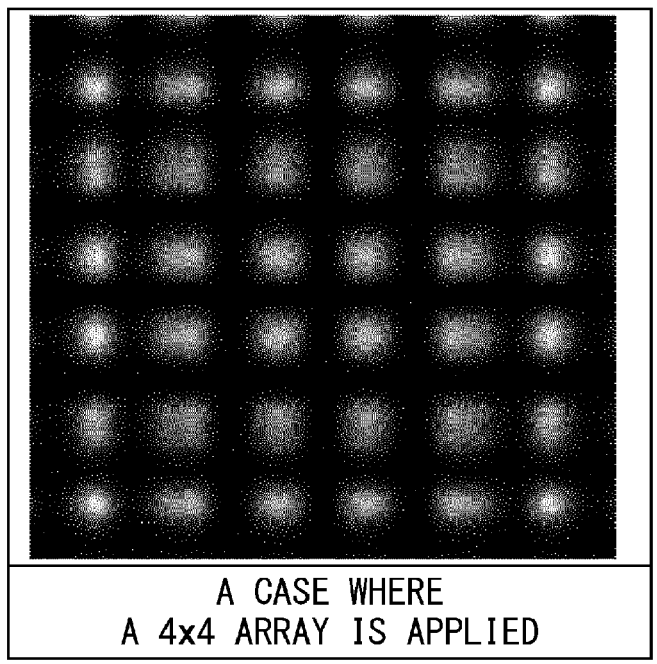
FIG. 5D is a diagram that illustrates a result of simulation of diffracted light of a microlens array having a 40 μm×40 μm period in accordance with Comparative Example 4.

The result of simulation of diffracted light of the 40 μm×40 μm pitch microlens array in which this 4×4 array is applied is illustrated in FIG. 5D. The density of the diffracted light is increased as compared with FIG. 1A and the unevenness of luminance is reduced. However, since the density of the diffracted light is small as compared with the basic 3×3 array of FIG. 1B, its effect of reduction in the unevenness of luminance is inferior to that of the present invention.

This application claims the priority based on Japanese Patent Application No. 2018-029694 filed on Feb. 22, 2018, the entire disclosure of which is incorporated herein by reference.

The invention claimed is:

1. A transmissive or reflective diffuser plate having a microlens array constituted by a plurality of microlenses, the microlens array being formed on at least either of a light incident surface or a light exit surface, wherein:
    the microlenses have the same effective diameter and substantially the same curvature and have a structure that creates an optical path length difference for transmitted light or reflected light;

each of the microlenses is arranged at intervals based on the effective diameter so as to constitute a two-dimensional basic periodic structure;

the microlenses constitute a basic block constructed by an array of N×N lenses, where N is an integer greater than or equal to 2, having the structure that creates the optical path length difference;

the basic blocks constitute, by repetitive arrangement thereof, a two-dimensional second periodic structure having a period that is N times as long as a period of the microlenses in the basic periodic structure;

the basic block is either an N×N array C in which elements in p rows and q columns, where p and q are integers that satisfy $1 \leq (p$ and $q) \leq N$, are defined according to expression (1):

$$C(p,q)=(p-1)(q-1) \bmod N \qquad (1), \text{ or}$$

an N×N array D obtained by an arbitrary row permutation or column permutation performed on the array C; and the optical path length difference created by the lens positioned in the p-th row and the q-th column with respect to the lens in the first row and the first column in accordance with the array C or D is set to C(p, q)/N times or D(p, q)/N times as long as a wavelength of incident light.

2. The diffuser plate according to claim 1, wherein the basic block is the array C.

3. The diffuser plate according to claim 1, wherein the microlenses constitute the basic block obtained by an array of N×N, where $2 \leq N \leq 11$, lenses having the structure that creates the optical path length difference.

* * * * *